United States Patent
Jokl, III et al.

(10) Patent No.: US 9,245,045 B2
(45) Date of Patent: Jan. 26, 2016

(54) AGGREGATING MISSING BIBLIOGRAPHIC INFORMATION IN A COLLABORATIVE ENVIRONMENT

(75) Inventors: Robert Lee Jokl, III, Tempe, AZ (US); Mohammad Saad Alam, New York, NY (US); Jacob D. Kustanowitz, Silver Spring, MD (US)

(73) Assignee: Citelighter, Inc., New York, NY (US)

( * ) Notice: Subject to any disclaimer, the term of this patent is extended or adjusted under 35 U.S.C. 154(b) by 320 days.

(21) Appl. No.: 13/474,678

(22) Filed: May 17, 2012

(65) Prior Publication Data

US 2013/0311872 A1    Nov. 21, 2013

(51) Int. Cl.
| H03M 7/30 | (2006.01) |
|---|---|
| H04M 3/00 | (2006.01) |
| H04L 29/08 | (2006.01) |
| G06F 17/30 | (2006.01) |
| G06F 17/21 | (2006.01) |

(52) U.S. Cl.
CPC ............ *G06F 17/3089* (2013.01); *G06F 17/21* (2013.01)

(58) Field of Classification Search
CPC .... G06F 17/2247; G06F 17/24; G06F 17/211
USPC ........................................................ 715/234
See application file for complete search history.

(56) References Cited

U.S. PATENT DOCUMENTS

| 7,600,022 | B2 * | 10/2009 | Takamine ........... H04L 67/1095 358/474 |
|---|---|---|---|
| 8,495,482 | B2 * | 7/2013 | Cohen et al. .................. 715/204 |
| 2001/0003818 | A1 * | 6/2001 | Pingel et al. .................. 707/102 |
| 2003/0002086 | A1 * | 1/2003 | Thomason .................... 358/448 |
| 2005/0091186 | A1 * | 4/2005 | Elish ................................ 707/1 |
| 2005/0216449 | A1 * | 9/2005 | Stevenson ........................ 707/3 |
| 2007/0083510 | A1 * | 4/2007 | McArdle ........................... 707/6 |
| 2007/0266342 | A1 * | 11/2007 | Chang et al. .................. 715/810 |
| 2008/0059891 | A1 * | 3/2008 | Herzog ........................ 715/751 |
| 2008/0189030 | A1 * | 8/2008 | Aoki .................. G01C 21/3691 701/533 |
| 2008/0235339 | A1 * | 9/2008 | Lurey et al. .................... 709/206 |
| 2008/0256470 | A1 * | 10/2008 | Bhogal et al. ................. 715/764 |
| 2009/0187818 | A1 * | 7/2009 | Compton et al. ............. 715/234 |
| 2012/0010995 | A1 * | 1/2012 | Skirpa et al. ............... 705/14.49 |

* cited by examiner

*Primary Examiner* — Cesar Paula
*Assistant Examiner* — Luu-Phuong Nguyen
(74) *Attorney, Agent, or Firm* — Middleton Reutlinger

(57) ABSTRACT

Techniques are provided which aggregate user selected content using a browser extension. A user may select content displayed in a web browser. The selected content may be captured, and the corresponding bibliographic information may be extracted by the browser extension. The user may input notes relating to the selected content. The selected content, bibliographic information and notes may be transmitted by the browser extension to one or more servers for storage, and may be associated with a user project entry. A subset of the bibliographic information may be presented to the user in accordance with a user selected bibliographic format.

23 Claims, 11 Drawing Sheets

400

...n of food," says mission spe...
...aking about 2,000 pounds of scie...
...g hygiene items, we're taking clothin...
...s of pounds of spare parts for the
...e support system, the electrical system,
and so forth. ✎ Capture e big things th...
we're trying to supply the station for a
...edges our bets against when the
...cargo contracts will be available up

402

...d after this final...

FIG. 4

AGGREGATING MISSING BIBLIOGRAPHIC INFORMATION IN A COLLABORATIVE ENVIRONMENT

BACKGROUND

Information research plays an expanding role in our economy and personal lives. For most of us, even the information research we conduct professionally today hails back to fundamental information research practices introduced to us in our educational years. But recent decades have seen huge changes in the sources and forms of information to be researched, and the student becomes a convenient example. Conventionally, students typically performed research for a school project by going to the library, and locating and photocopying books and magazine and newspaper articles that pertain to the topic of the school project. However, since the advent of the Internet and due to the popularity of search engines, students are now much more likely to perform such research online. For example, various search engines often serve as a launch pad for an educational research project. A student may collect web pages that pertain to the topic of the school project, for instance, in lieu of going to the library and locating relevant books and magazine and newspaper articles. However, given the convenience and speed of the Internet, as well as the characteristic operation of the tools used to access Internet data, the information obtained may quickly become unmanageable. Organizing this information may thus become overwhelming and time consuming.

SUMMARY

Embodiments of the invention provide systems and methods for intelligently aggregating and tracking user selected content using an extended browser capability. The browser extension may receive user selection of content that is displayed in a web browser. In some embodiments, the browser extension may also receive associated metadata from the web browser. The browser extension may receive user interface signal(s) indicating user selection of content. The user interface signal(s) may indicate for example, highlighting of content using a mouse. In some embodiments, content may be selected using the keyboard or a voice command. In some embodiments, once the content is selected, the browser extension may display a user interface element such as for example, an in-line capture button. The selected content may include textual information. In some embodiments, the textual information may be part of a PDF document, an electronic book, or journal.

The selected content may be captured by the browser extension in response to a user interface action. In some embodiments, the user interface action may be clicking of the in-line capture button. Alternatively, the user interface action may be clicking of a button on a toolbar.

The browser extension may extract bibliographic information corresponding to the selected content. The bibliographic information may include information such as, author's first name, author's last name, title of article, publication date, etc. In some embodiments, if the browser extension is unable to extract some of the bibliographic information, or if the extracted bibliographic information contains an error, the user may manually input or correct bibliographic information. In some embodiments, the user may also manually input notes corresponding to the selected content and may also manually input the content and the corresponding bibliographic information.

The browser extension may transmit the selected content and the bibliographic information, which includes the extracted bibliographic information and the user input bibliographic information, to one or more servers for storage on the one or more servers. In some embodiments, the notes may also be transmitted to the one or more servers for storage. The selected content, bibliographic information, and the notes may be stored on for example, cloud storage database(s). The selected content, bibliographic information, and the notes may be associated with a user project entry. One or more of the selected content, bibliographic information, and the notes may be exported to a secondary application, such as a word processing application, an email application, social networking application, cloud storage application, etc. In some embodiments, a subset of the bibliographic information may be exported in accordance with a user selected bibliographic format such as, APA, MLA, Chicago, etc.

The browser extension may present the selected content and a subset of the bibliographic information to the user in accordance with a user selected bibliographic format. For example, if an article contains more than three authors, MLA style dictates listing the first author's name followed by "et al." By contrast, APA style requires listing all three authors' names. Thus, although the extracted bibliographic information may contain all three authors' names, only the first author's name may be presented if the MLA format is selected. In some embodiments, the notes may also be presented along with the selected content and the subset of the bibliographic information.

BRIEF DESCRIPTION OF THE DRAWINGS

The novel features of the invention are set forth in the appended claims. However, for purpose of explanation, several aspects of a particular embodiment of the invention are described by reference to the following figures.

FIG. 4 is a diagram depicting an in-line capture button in accordance with one embodiment of the present invention;

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
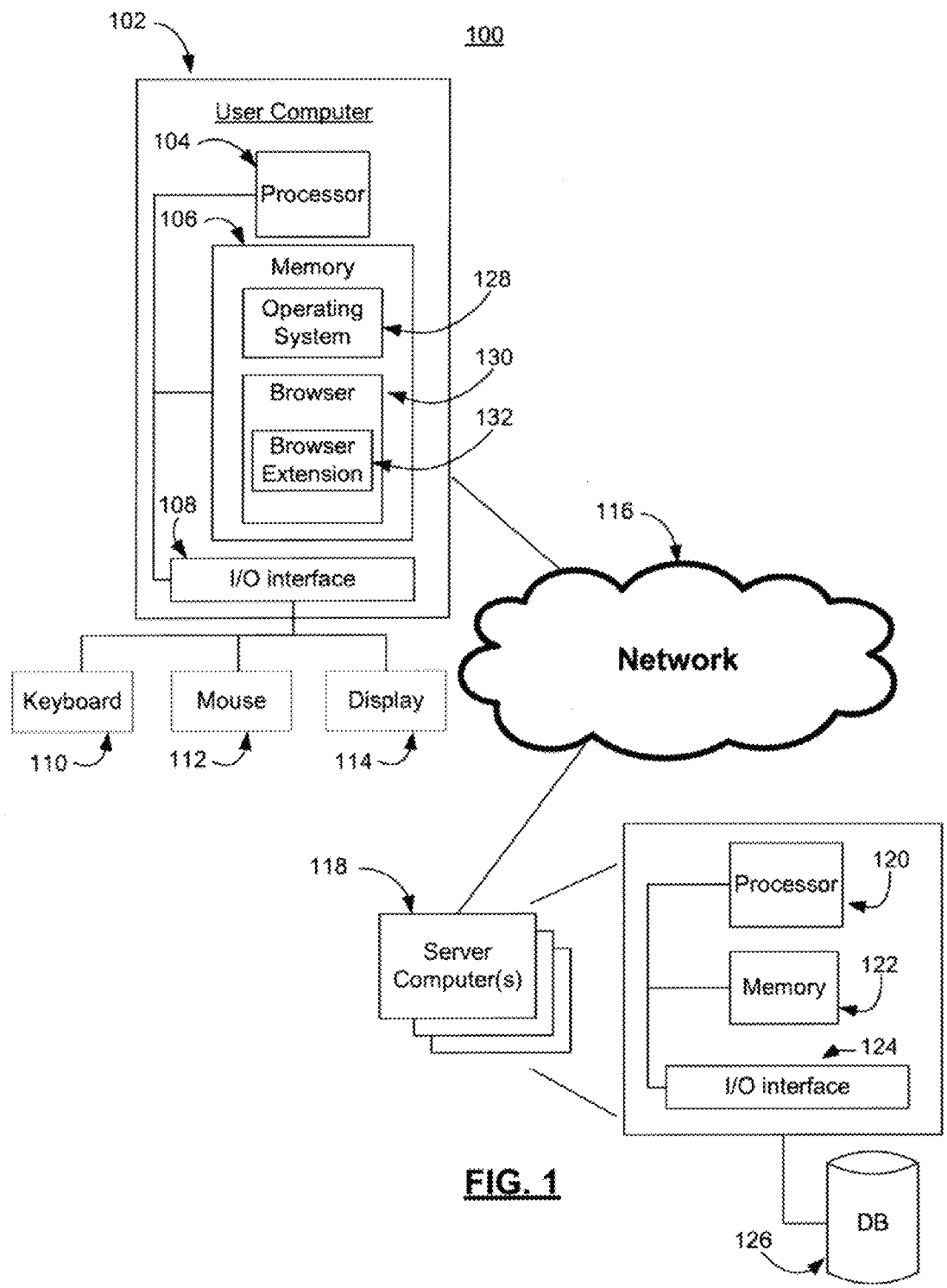
FIG. 1 is a block diagram of a computer system in accordance with one embodiment of the present invention.

FIG. 1 is a diagram of an illustrative computer system that may employ aspects of the invention. Computer system 100 includes user computer 102, and one or more server computers 118 connected by network 116. User computer 102 includes a processor 104 to execute instruction sequences (e.g., a CPU), an input output (I/O) interface 108, and a memory 106 for storing software instructions and data. User computer 102 includes software such as operating system 128 and web browser application 130 in memory 106. Memory 106 may include one or more of RAM, ROM, a hard disk drive, flash memory, and other such persistent and non-persistent computer storage mechanisms. Web browser application 130 includes browser extension 132. User computer 102 may further include standard user interface (UI) devices like a keyboard 110, a mouse 112, and a display device 114. Many packaging embodiments are possible and user computer 102 may be or include any device operable to run a web browser application, such as desktop or laptop PCs, game consoles, as well as, wireless, mobile, or handheld devices such as smart phones, PDAs, tablets, etc.

Web browser 130 may be any one of a number of conventional web browser applications, such as INTERNET EXPLORER™ by MICROSOFT, FIREFOX™ by MOZILLA, SAFARI™ by APPLE, or CHROME™ by GOOGLE. An embodiment may include a web browser 130 that is not a general purpose web browser such as the aforementioned, but a special purpose browser application that, for example, is restricted in the sites it targets or the type or format of the content it renders. In one embodiment, web browser 130 renders web page content and may receive user input data via keyboard 110, and/or mouse 112. User input data may also be received by web browser 130 via other means such as a voice command. User input data may be input into rendered form fields for sending to one or more servers, such as server computer(s) 118. In the depicted embodiment, user computer 102 is coupled to external systems by a network 116, such as the Internet. For example, user computer 102 is coupled to one or more server computer(s) 118 via network 116. Each physical server computer of server computer(s) 118 typically includes one or more processors, such as processor 120, a memory 122, and an I/O interface 124. Server computer(s) 118 may be coupled to one or more databases such as database 126. In one embodiment, server computer(s) 118 may be a web content server hosting a web page. Database(s) 126 may be part of a cloud storage system, and may be used to store user input data and data retrieved or extracted from web browser 130 by browser extension 132. One or more of server computer(s) 118 may be in communication via network 116, another network (such as a LAN), or other means, and configured with software to together provide an array of server-based data processing functions for a particular application, together referred to as an application server. The division of tasks, allocation of work, and the degree and type of intercommunication among the server computer(s) 118 together forming the application server (where multiple of the server computer(s) 118 are involved) may be determined at the application server, the user computer 102, or both. In various embodiments, 110 interface 108 and I/O interface 124 may include analog modems, digital modems, or a network interface card. The particular type of and configuration of user computer 102, and server computer(s) 118 are not essential to embodiments of the present invention.

As used herein, web browser extension 132 is a code package that may be installed, incorporated, or otherwise integrated into web browser 130 and/or user computer 102 running web browser 130. Browser extension 132 may, for example, add a new feature to a browser, extend an existing functionality, and/or modify a visual theme. One example of a browser extension is a toolbar extension that runs in conjunction with a web browser to, in part, display a toolbar graphical user interface (GUI) within a larger graphical user interface of the web browser, and also to direct the execution of computer processing as required to respond to user interface signals related to the toolbar GUI, effecting user desired computer processing. The toolbar graphical user interface may provide various areas for a user to interact with the toolbar, such as button(s) or text windows, so that the user may quickly and easily perform actions within the web browser. In some embodiments, the toolbar may provide a field to submit a search query, or buttons to automatically redirect the web browser to a home page, or any other specific webpage.

Browser extension 132 may employ an extensible markup language (XML) user-interface language (XUL) to describe and support application user interfaces. XUL provides an overlay functionality that facilitates merging user interfaces from different sources into one user interface (UI). For example, UI from a browser and a browser extension(s) may be merged. Recall that a browser extension may provide additional functionality for a browser. This functionality may include, for example, additional UI features (e.g., toolbar, menu) that facilitate customizing a browser UI.

Browser extension 132 may interact with the collective UI adornment for browser application 130 (e.g., border, menus, frames, toolbars, buttons, scrollbars). Browser extension 132 may include a XUL file(s), JavaScript, a style sheet(s), an image(s), etc. This set of items may be loaded into a single package (e.g., Zip file). The package may be loaded into, unwrapped by, and installed on a client device such as user computer 102. Once installed, package components may be operably connected to browser application 130 and/or browser object(s) using the XUL overlay feature. Though added to a browser, browser extension code may remain separate and removable. Browser extension 132 may reside in browser application 130 and/or user computer 102 rather than being part of a web page transmitted by a web service to the browser application and/or client device.

In one embodiment, browser extension 132 may observe and record events or actions occurring within web browser 130. For example, browser extension 132 may be able to detect what web pages a user visits, what hyperlinks a user clicks on, or any other information displayed in web browser 130.

Figure 2:
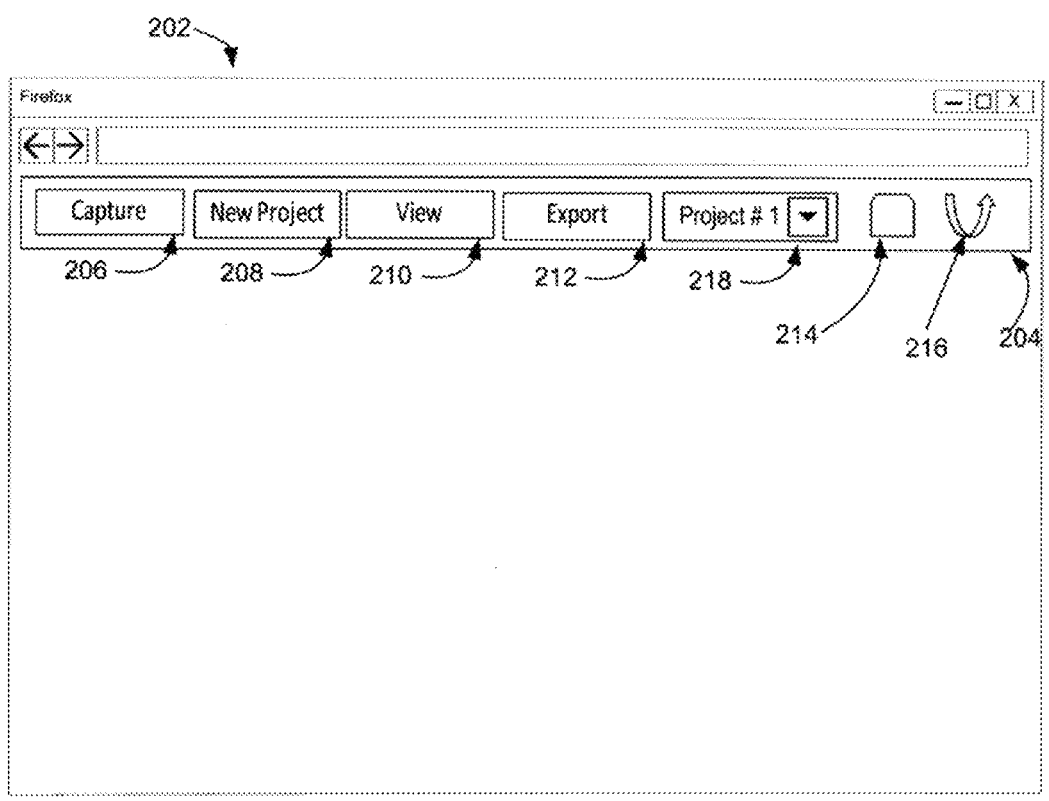
FIG. 2 is a diagram depicting a graphical user interface of a browser extension in accordance with one embodiment of the present invention.

FIG. 2 is a screenshot diagram depicting a graphical user interface of a web browser including a browser extension in accordance with one embodiment of the present invention. Web browser display screen 202 includes a browser extension portion which adds toolbar 204 to web browser 202. Toolbar 204 runs in conjunction with web browser 202 to provide a graphical user interface within a larger graphical user interface of web browser 202. Toolbar 204 provides various areas for a user to interact with toolbar 204, such as buttons 206-216 and dropdown menu 218 so that the user may quickly and easily indicate a request that actions be performed from within web browser 202. In some embodiments, toolbar 204 may provide a field (not shown) to submit a search query, button 214 to automatically redirect the web browser to a home page, or any other specific webpage, or button 216 to refresh toolbar 204.

In one embodiment, a user may select content displayed in web browser 202 using one or more user interface actions, such as for example, using a mouse, or keyboard. In response to the mouse or keyboard user inputs the user is presented with an indication of the selected content, such as a visual highlighting of the selected content on a display screen. Such visual highlighting is frequently achieved by displaying the selected content with the background color different from that of the non-selected content. Once the content is selected, the user may initiate a user interface action, such as clicking capture button 206 on toolbar 204. Clicking of capture button 206 may capture the selected content. In some embodiments, during capture the browser extension may receive from web browser 202, the data visible to the user when making the selection as well as underlying and associated metadata that was not necessarily visible or apparent to the user from the observable data presentation. For example, the browser extension may receive webpage HTML tag information associated with the selected content. In addition, bibliographic information corresponding to the selected content may be extracted by the browser extension. The bibliographic information may include for example, article title, author first name, author last name, website title, website address (e.g., URL), date of publication, etc. The browser extension may extract all of the available bibliographic information. In one embodiment, the browser extension may identify bibliographic information by detecting HTML tags. For example, a title may be identified by detecting h1-h6 tags, which may be used to designate headings.

In some embodiments, the browser extension may use pattern matching or other rules to extract bibliographic information from the webpage. In one example, the browser extension may submit a request to an application server after a user initiates a capture to obtain rules specific to the site from which the webpage originated. The application server may search a database for linking rules specific to the domain or URL of a site. The browser extension then receives a response from the server with such information, which in turn is used by the browser extension to instruct, direct, control, or condition the extraction of bibliographic information. For example, the HTML code for web-accessible articles available from the cnn.com domain may be written such that the author's name may be defined in a field named "auth". The application server may notify the browser extension of this rule so that the browser extension may search the HTML code for the "auth" field to extract the author's name. If for example, rules specific to that site or domain are not available from the application server, the browser extension may search for bibliographic information in the HTML code by searching, for example, tag names, meta tags, URL path, etc. In some embodiments, the browser extension may search for fields, IDs, classes, variables, etc., that are likely to contain bibliographic information. For example, fields named "auth", "author", "first name", "last name", etc. are likely to contain author name information. An alternative embodiment could, for example, employ both the site-specific and generic (or non-site specific) extraction rules in order to extract a collection of bibliographic data associated with the content selected by the user. An alternative embodiment could, for example, include or construct a locally maintained collection of site-specific extraction rules to supplement or substitute for server-based rules. One of skill, accordingly, sees that the source location for extraction rules (local- and application server-based) and the scope of applicability of extraction rules (site-specific and generic) are factors for creating permutations of various embodiments—different combinations are possible. Additionally, the stored rules that are used to direct the process of bibliographic information extraction may take many forms (whether that processing occurs locally on the user computer or as a function of the application server). In one embodiment the rules are stored in the form of procedural code, possibly JavaScript. In another embodiment the rules are stored in the form of regular expressions (regex, regexp). Other embodiments are possible.

In some embodiments, the browser extension may employ other methods to search for bibliographic information. In one example, the browser extension may parse the page title, or conduct pattern matching within the page text.

The captured content that was selected by the user and the extracted bibliographic information may be transmitted by the browser extension for storage onto one or more servers (e.g., server computer(s) 118 in FIG. 1) of an application server. The server(s) may store the captured content and bibliographic information on one or more databases (e.g., database 126 in FIG. 1). The captured content and corresponding bibliographic information may be assigned to a user project entry. A user may select from previously created projects using drop down menu 214 which, when expanded in response to user interaction displays a listing of previously created projects. Content selected by the user and the corresponding bibliographic information may be captured and designated as one entry within the selected project.

A user may create a new project by clicking on new project button 208 to, in one embodiment, initiate the display of additional GUI elements, such as a pop-up window with blank fields and prompting information, for the entry of information to define a project item in computer storage. The new project item may then be immediately sent, in whole or in part, to an application server in some embodiments. Each project may correspond to a research topic. For example, if a user is conducting research for a paper on Abraham Lincoln, and another paper on Barack Obama, the user may create a new project for Abraham Lincoln and another new project for Barack Obama. The user may select the project to which captured content should be assigned by using drop down menu 214.

Clicking export button 212 may present the user with an option to export the selected project to a secondary application, such as a word processing application, an email application, or to share the selected project via a social networking platform. As part of the exporting operation, each entry associated with the selected project may have its constituent data items selectively chosen, reformatted, aggregated with others, combined with metadata, and/or combined with additional data sequences and items required by the target application, and such, to altogether produce an exportable representation of the project in storage in a format recognizable to the target secondary application. In addition, the exportable representation may be constructed with features and formatting compatible with the particular mechanism used to effect the export (e.g., OLE, Clipboard, memory-mapped files, DDE, Mailslots, pipes, forking, spawning, and the like).

Figure 3:
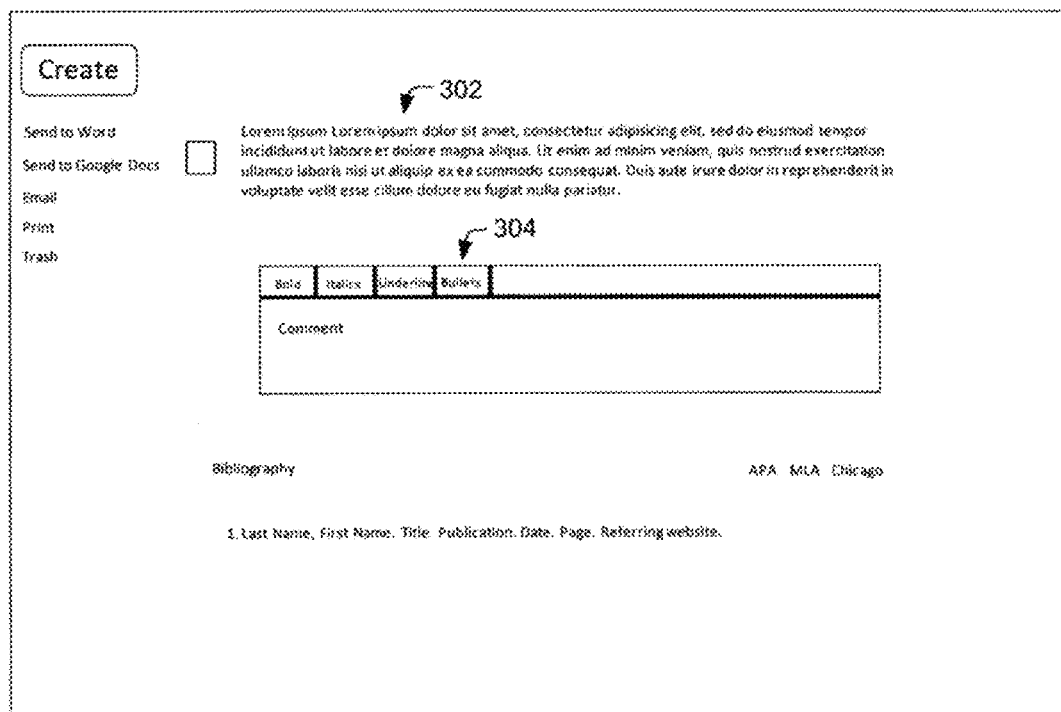
FIG. 3 is a screenshot diagram of a project entry in accordance with one embodiment of the present invention.

Clicking view button 210 may present the captured content and corresponding bibliographic information to the user as shown in screenshot 300 of FIG. 3. As shown in FIG. 3, selected content 302 may be presented along with the corresponding bibliographic information. The bibliographic information may be presented to the user in accordance with one or more bibliographic formats, such as APA, MLA, Chicago, etc. In some embodiments, a subset of the extracted or captured bibliographic information may be presented to the user based on the selected bibliographic format. For example, if an article contains more than three authors, MLA style dictates listing the first author's name followed by "et al." By contrast, APA style requires listing all three authors' names. Thus, although the extracted or captured bibliographic information may contain all three authors' names, only the first author's name may be presented if MLA is the selected format.

Form field 304 may be displayed along with selected content 302 and the corresponding bibliographic information. A user may input notes relating to selected content 302 in form field 304. The notes may be transmitted by the browser extension to one or more server computers 118 for storage on one or more server computers 118. The notes, selected content, and corresponding bibliographic information may be designated or assigned to a user project entry. In one embodiment, the notes, selected content, and corresponding bibliographic information may be presented to the user as shown FIG. 3 in a pop-up window. Alternatively, or in addition, the notes, selected content, and corresponding bibliographic information may be presented to the user as part of a web page.

In one embodiment, once a user has selected content, a user interface element may be displayed "in-line" with the selected content by the browser extension. For example, FIG. 4 shows screenshot 400 with an in-line capture button 402 displayed adjacent to the selected content. In-line capture button 402 may be displayed in response to the user selection of content, such as a user highlighting content. The user may click in-line capture button 402 to capture the selected content and corresponding bibliographic information, and store the selected content and corresponding bibliographic information on one or more server computers (e.g., server computer(s) 118 in FIG. 1). In some embodiments, in-line capture button 402 may be displayed over (e.g., overlaid on top of), overlapping, or abutting the selected content. In describing the display position of the in-line capture button GUI element, the in-line capture button 402 would be considered "very close" to the selected content at any of the previously mentioned positions plus positions where it is separated from the selected content by no more than about 2% of the maximum vertical screen dimension; and considered "close" to the selected content at any of the previously mentioned positions plus positions where it is separated from the selected content by no more than about 5% of the maximum vertical screen dimension; and considered "near" to the selected content at any of the previously mentioned positions plus positions where it is separated from the selected content by no more than about 10% of the maximum vertical screen dimension; and considered "nearby" to the selected content at any of the previously mentioned positions plus positions where it is separated from the selected content by no more than about 20% of the maximum vertical screen dimension.

Figure 5:
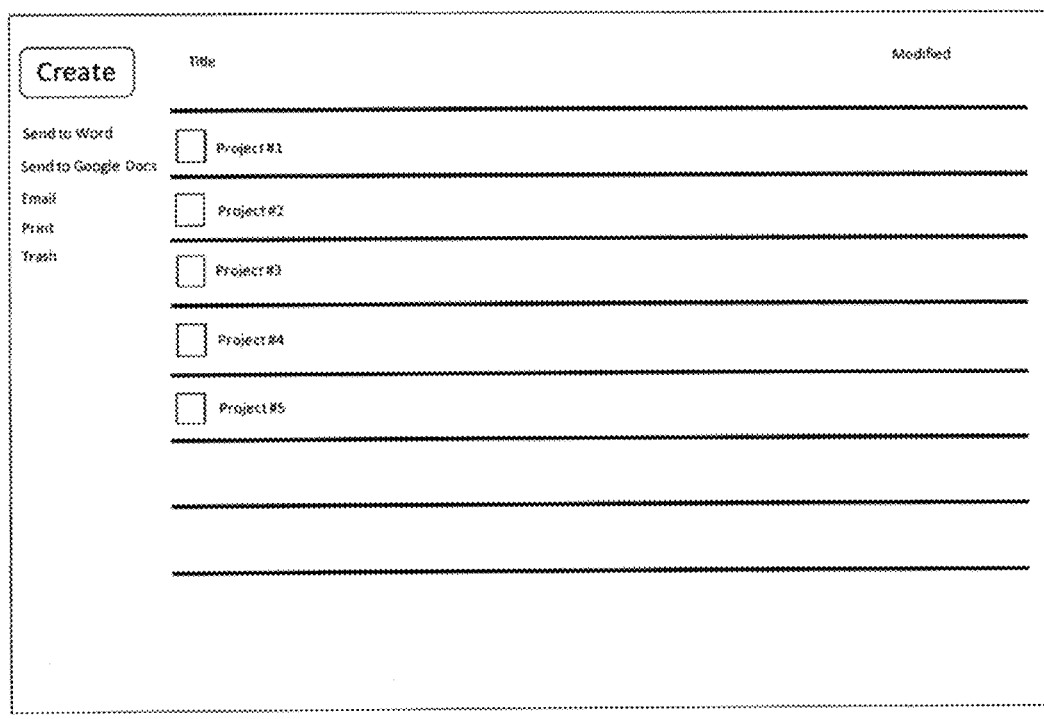
FIG. 5 is a screenshot diagram of user projects in accordance with one embodiment of the present invention.

FIG. 5 depicts a screenshot 500 of a "my projects" page in accordance with one embodiment of the invention. Screenshot 500 lists the user's projects by title of the project. The project titles depicted in screenshot 500 include Project#1, Project#2, Project#3, Project#4, and Project#5. It may also include additional information such as the date each project was last modified. The user may select one or more projects to export to a secondary application as previously described. In addition, the user may print or delete one or more selected projects. A new project may also be created by clicking on the "Create" button. In one embodiment, a user may select a project using various user interface actions, such as single-clicking or double-clicking a project using a mouse or may select a project using a keyboard. Selecting a project may present the user with the project entries associated with that project, as shown in FIG. 6.

Figure 6:
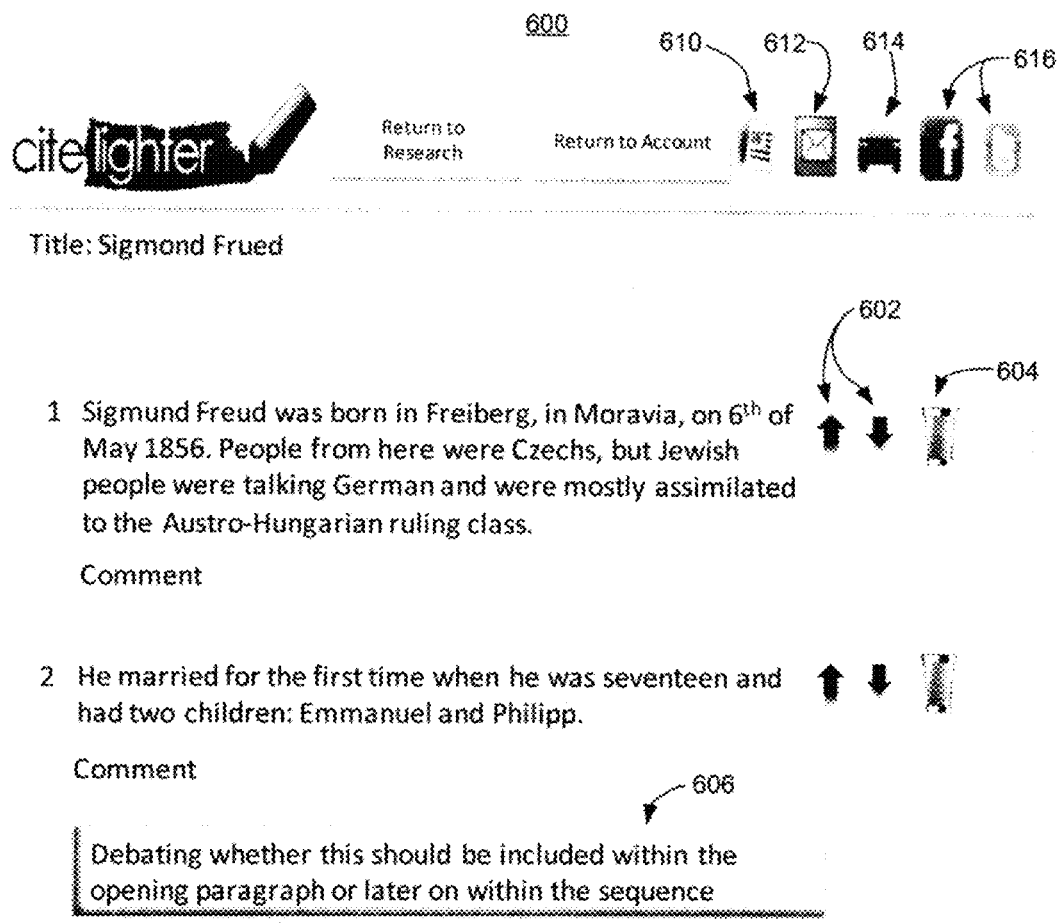
FIG. 6 is a screenshot diagram of project entries associated with a project in accordance with one embodiment of the present invention.

FIG. 6 shows a screenshot 600 displaying entries associated with a project. Screenshot 600 shows project entries 1 and 2, each project entry including content that was selected by the user. Entry 2 also includes note 606 that was entered by the user. A subset of the bibliographic information 618 and 620 corresponding to entries 1 and 2 may also be displayed as shown in FIG. 6. The subset of the bibliographic information may be displayed in accordance with a user selected bibliographic format. For example, the user may select the bibliographic format using drop down menu 608. Available options may include for example, APA, MLA, Chicago, etc.

User interface elements 602 may be used by the user to organize, arrange, and rank the project entries in a particular order. For example, clicking on the down arrow next to entry 1 may move entry 1 to be below entry 2. In some embodiments, project entries may be organized, arranged, and ranked by "dragging and dropping" using for example, a mouse. User interface element 604 may be used by the user to delete individual entries within the project. The user may click user interface elements 610, 612 and 616 to export the project to a secondary application. For example, the user may click button 610 to export the project to a word processing application, or click button 612 to export the project to an email application, or click buttons 616 to share the project via a social networking platform. Similarly, the user may click button 614 to print the project entries.

In some embodiments, when a project is exported to a secondary application, a subset of the bibliographic information may be presented in the secondary application in accordance with the selected bibliographic format. For example, if an article contains more than three authors, MLA style dictates listing the first author's name followed by "et al." By contrast, APA style requires listing all three authors' names. Thus, although the extracted bibliographic information may contain all three authors' names, only the first author's name may be presented if the MLA format is selected.

Figure 7A:
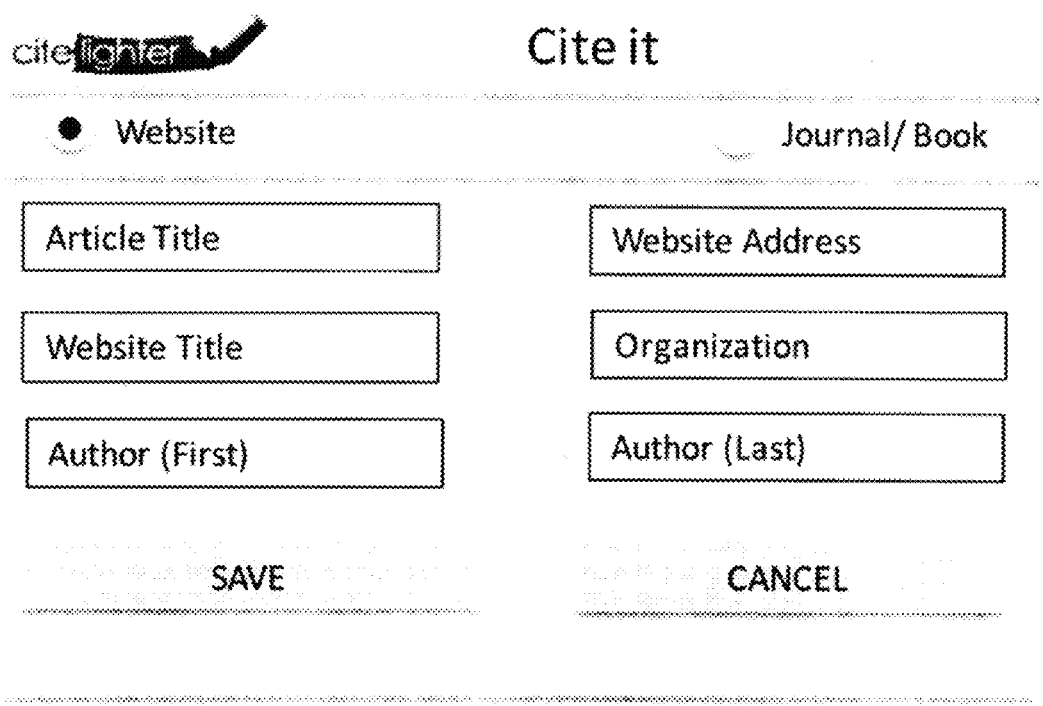
FIGS. 7a-7c are screenshot diagrams of form fields that may be used to edit or input content and bibliographic information in accordance with one embodiment of the present invention.

In some embodiments, the extracted bibliographic information may contain an error or one or more fields of the bibliographic information may be empty. The user may edit the extracted bibliographic information, or manually input the missing bibliographic information. FIG. 7a is a screenshot 700 of form fields where the user may edit extracted bibliographic information or manually input missing information. FIG. 7a shows form fields corresponding to bibliographic information of a website.

Figure 7B:
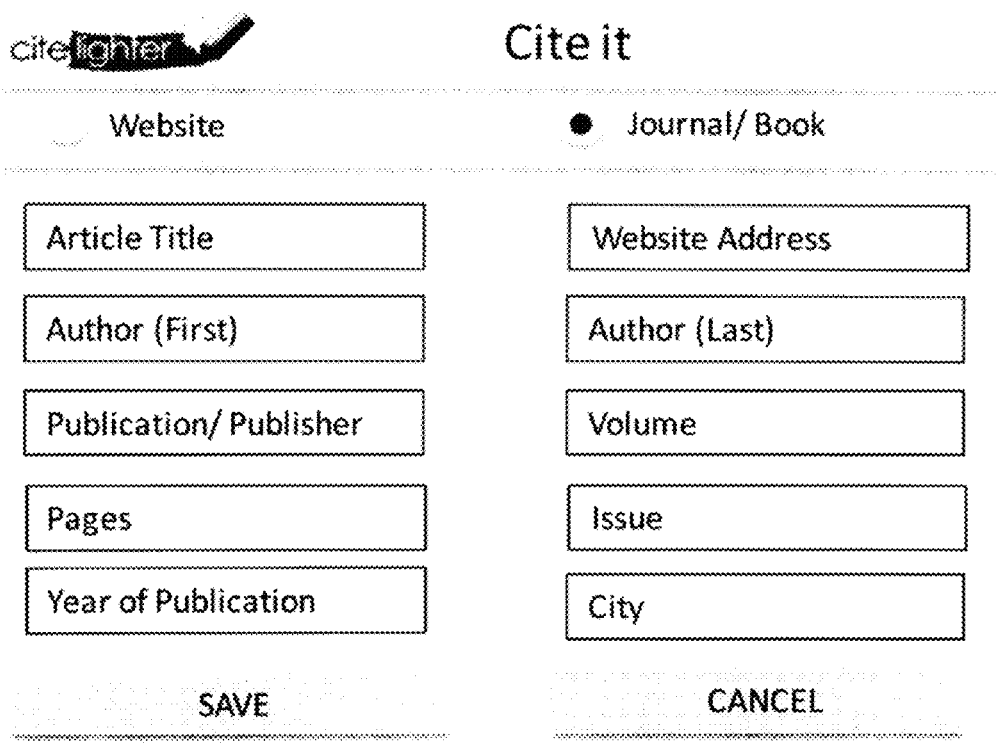

In some embodiments, various different form fields may be provided for varying sources. For example, FIG. 7b shows a screenshot 800 of form fields corresponding to bibliographic information of a journal or book. The user may edit extracted bibliographic information, or manually input missing bibliographic information corresponding to a journal or book using the form fields shown in FIG. 7b.

Figure 7C:
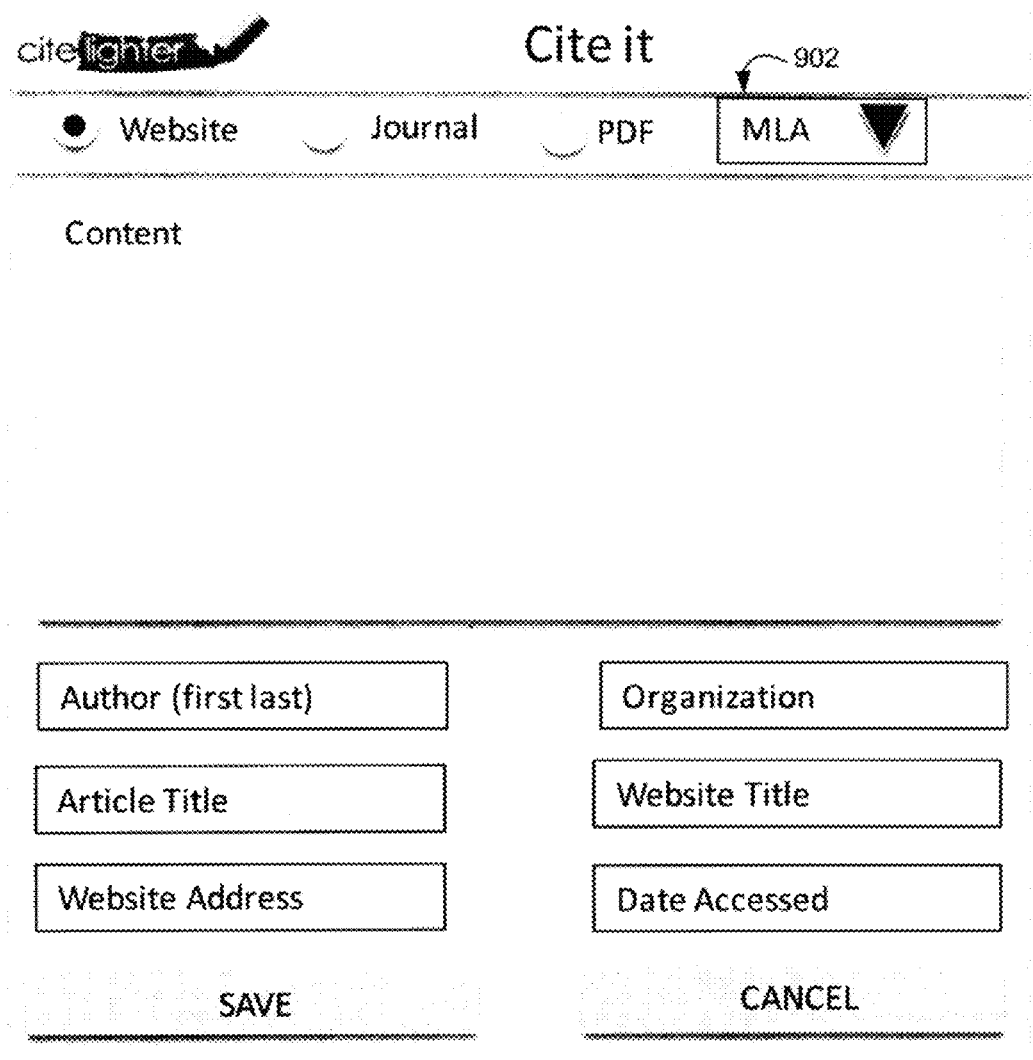

In some embodiments, the user may manually input not only the bibliographic information, but also the corresponding content information. FIG. 7c shows a screenshot 900 of form fields where the user may input content and the corresponding bibliographic information. The user may select the type of source by selecting the website radio button, journal radio button or pdf radio button. The user may also select the bibliographic format using drop down menu 902.

The bibliographic information provided by the user, including the bibliographic information that was edited by the user, may be saved on one or more servers (e.g., server computers 118 in FIG. 1) and may be retrieved by the browser extension on subsequent visits to the webpage. For example, if a user captures content from an article on www.nytimes.com and edits the bibliographic information extracted by the browser extension (e.g., to correct an error), or manually inputs missing fields of the bibliographic information, the bibliographic information is saved on one or more servers. When a subsequent user (or the same user) captures content from the same webpage, the browser extension may retrieve the previously saved bibliographic information and integrate it with bibliographic information that the browser extension may extract using the rules obtained from one or more servers as previously described. An embodiment may, for example, perform the integration by merely copying fields from the previously saved bibliographic information where those fields remained blank after rules-based extraction. Another embodiment may, for example, perform the integration by preferentially using previously saved bibliographic information and supplementing that with new rules-based extraction data. Yet another embodiment may, for example, including integration procedure where a preference for saved bibliographic information or rules-based extraction data can be specified on a field by field basis. Other embodiments are possible. In some embodiments, user provided bibliographic information may be stored in a "global" set of bibliographic information possibly identified using corresponding URLs and/or domain information. The browser extension may retrieve bibliographic information from the "global" set of bibliographic information when a user selects content from a site for which identifiable bibliographic information is stored in the "global" set. User-provided bibliographic information may be saved not only in the user's project entry but may also be used to update the "global" set of bibliographic information. In some embodiments, rules may be implemented to improve accuracy and to prevent malicious editing of bibliographic information, in one example, user provided bibliographic information may be used to update the "global" set of bibliographic information only after a predetermined number of users have provided the same information. For example, assume there is an error in the spelling of an author's last name in an article on "nytimes.com", and a user corrects the spelling. The user corrected spelling may not be used to update the "global" set of bibliographic information until at least 50 other users provide the same spelling.

Figure 8:
FIG. 8 is a screenshot diagram of a search page in accordance with one embodiment of the present invention.
Figure 8:
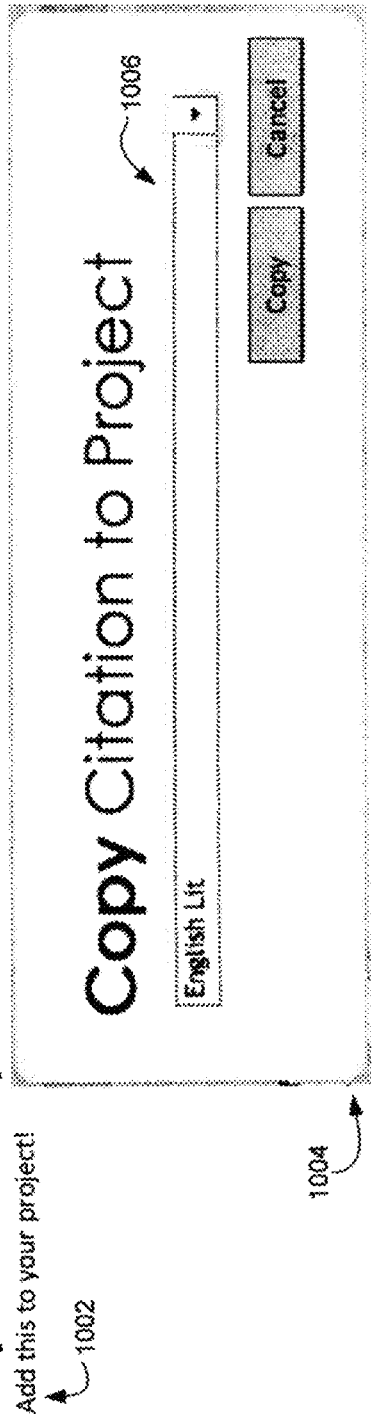

FIG. 8 depicts a screenshot 1000 of a search page. When conducting a search, a user may choose to search only his projects by selecting the My Projects radio button, or may search other users' projects by selecting the All Citelighter radio button. The user may copy a citation from the search results to a selected project by for example, clicking link 1002. Clicking link 1002 may display prompt 1004. The user may select a project from the user's account, using drop down menu 1006. The citation, which includes the content and the corresponding bibliographic information, may be copied to the selected project when the user clicks the copy button.

Figure 9:
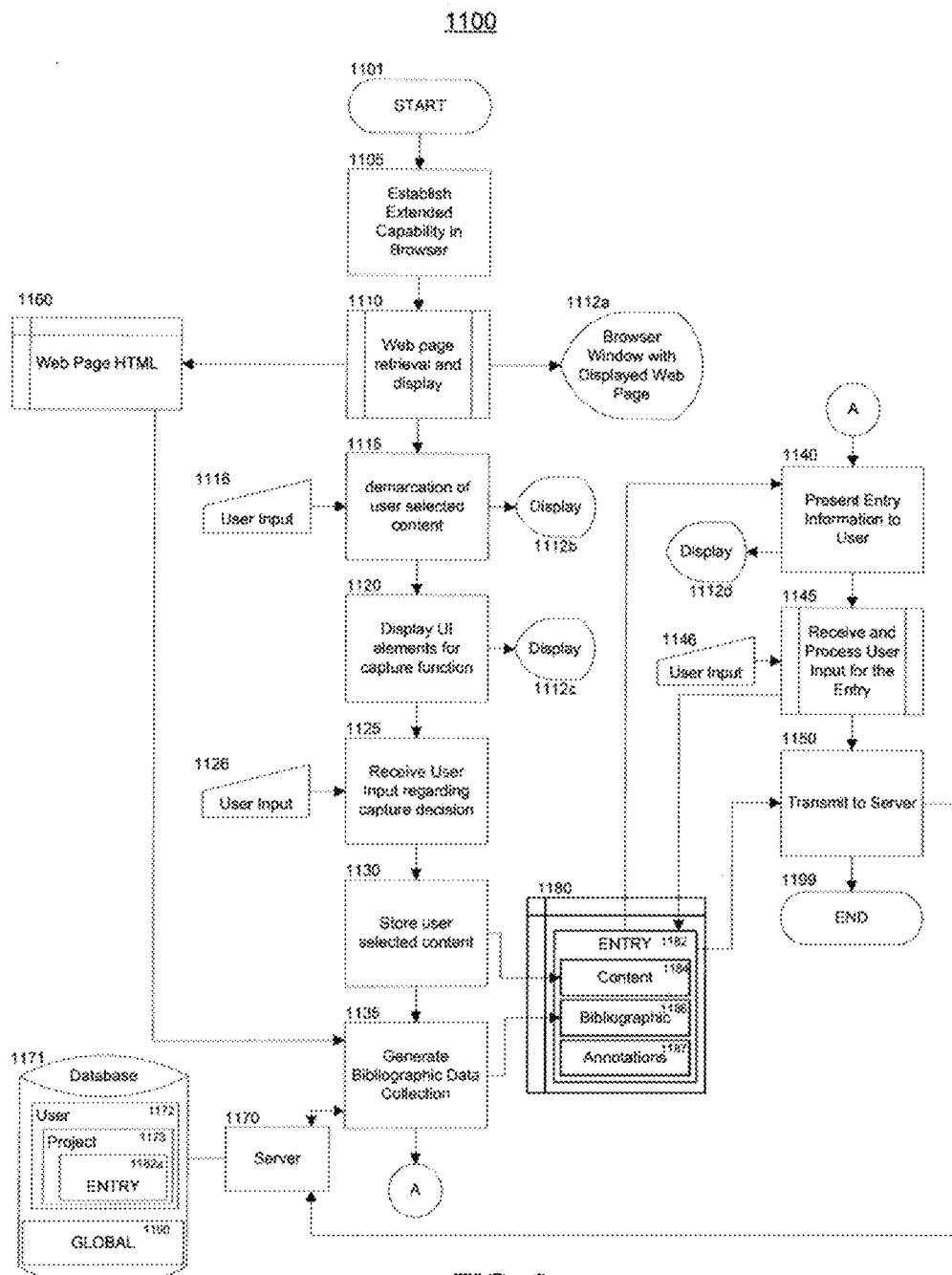
FIG. 9 is a flow diagram illustrating a method according to one embodiment of the invention.

FIG. 9 is a flowchart illustrating method 1100 according to one embodiment of the invention. Method 1100 indicates one possible flow of execution in an example embodiment. Depending on the embodiment, steps illustrated herein may be rearranged or omitted.

At 1105, a browser extension is installed on a web browser application. The browser extension may add a new feature to the web browser application, extend an existing functionality, modify a visual theme, etc. One example of a browser extension is a toolbar extension that runs in conjunction with a web browser to, in part, display a toolbar graphical user interface (GUI) within a larger graphical user interface of the web browser (consider, here, too, the earlier discussion of FIG. 2, especially as regarding toolbar 204), and also to direct the execution of computer processing as required to respond to user interface signals related to the toolbar GUI, effecting user desired computer processing. The toolbar graphical user interface may provide various areas for a user to interact with the toolbar, such as button(s) or text windows, so that the user may quickly and easily perform actions within the web browser. Though added to a web browser, the browser extension may remain separate and removable. The browser extension may reside in the web browser application and/or the client device (e.g., a user computer) rather than being part of a web page transmitted by a web service to the web browser application and/or client device. The browser extension may have special privileges e.g., access to shared memory with the web browser application, etc.

Processing block 1110 is shown using the standard flowchart shape for a predefined process. Processing block 1110 is representative of retrieval of web page HTML code by the web browser application. This may be in response to, for example, a user entering a URL, clicking a link, or entering a search term. To avoid overcomplicating the drawing, detailed steps of the web page retrieval process have been omitted. As a result of the webpage retrieval, the web browser stores retrieved data associated with a webpage, including one or more sections of HTML code, as indicated at block 1160. Moreover, block 1160 is shown using the standard flowchart symbol for internal storage. While shown as internal storage, however, use of persistent storage in combination will be apparent to one of ordinary skill in the art.

As a further result of the processing at 1110 the web page is displayed within a web browser window as represented by block 1112a. The web browser window includes the collective UI for the web browser application (e.g., border, menus, frames, toolbars, buttons, scrollbars, etc.) which may include the UI elements augmented by the browser extension. It should be noted that other presentation actions 1112b-d shown in flowchart 1100 may be updates to the existing display window 1112a, or may involve other types of user presentation such as additional windows (e.g., pop-up windows), voice output, or the like.

User input 1116 may be received by the web browser application at 1115 to indicate user selection of content. The user input may include for example, using a mouse, keyboard, or voice command. During the process or at the conclusion of the processing of user input to identify selected content the display window may be updated to reflect the user input (e.g., highlighting of the content indicated for selection by the user) as indicated by block 1112b.

At 1120, UI elements which facilitate capturing of the selected content may be displayed. In one embodiment, the UI element may be an in-line capture button. (Consider, here, too, the earlier discussion of FIG. 4.) The display window may be updated accordingly to display the UI element as indicated by block 1112c. It is noted that the processing of block 1120 may be optional, and particularly where a user may initiate capturing of content by for example, interacting with UI elements displayed in a toolbar (e.g., capture button 206 in FIG. 2). While optional, a preferred embodiment may include this processing.

Step 1125 receives user input 1126 regarding the capture decision made by the user. User input 1126 may include clicking of the in-line capture button. As one alternative, user input 1126 may include clicking of a button on a toolbar (e.g., capture button 206). At 1130, the selected content is stored in the content storage portion 1184 associated with user project entry 1182. Block 1180 depicts internal storage including project entry 1182. While shown as internal storage, however, use of persistent storage in combination will be apparent to one of ordinary skill in the art. Storage Block 1180 includes project entry 1182, which further includes content storage portion 1184, bibliographic information storage portion 1186, and annotations storage portion 1187.

At step 1135, a bibliographic data collection is generated. (Consider, here, too, the earlier discussion of FIG. 2, especially as regarding bibliographic data extraction.) The bibliographic data collection includes multiple data items, and is the superset of fields needed for multiple different predefined bibliographic formats (APA, MLA, and Chicago, for example). The bibliographic data items for the bibliographic data collection may be extracted from the webpage HTML. Alternatively, or in addition, one or more bibliographic data items may be retrieved from server 1170 (e.g., from the global set of bibliographic information 1190). In some embodiments, the bibliographic data collection may also be provided to server 1170 for storage (e.g., on a database) as part of the processing of block 1135. In such a case, the computer-generated bibliographic data collection is accordingly made available for use on the server before the user has an opportunity, in this flow, to modify the data or terminate the process. The bibliographic data collection may be used at the application server to update the "global" set of bibliographic information 1190.

At 1140, user project entry information, which may include one or more of content information 1184, bibliographic information 1186, and annotations 1187, is presented to the user. (Consider, here, too, the earlier discussion of FIG. 3.) A subset of the generated bibliographic data collection may be presented to the user in accordance with a user-selected bibliographic format (for example, APA, MLA, or Chicago). For example, if an article contains more than three authors, MLA style dictates listing the first author's name followed by "et al." By contrast, APA style requires listing all three authors' names. Thus, although the bibliographic data collection may contain all three authors' names, only the first author's name may be presented if the MLA format is selected. In one embodiment, the display window may be updated to display the user project entry information as indicated by block 1112d. Alternatively, user project entry information may be displayed in a pop-up window. Other alternatives, as well, are readily apparent to one of skill in the art.

At 1145, user input 1146 is received and processed. As shown and discussed in relation to FIGS. 3 and 6-7c, user input 1146 may include adding annotations (e.g., notes/comments relating to the selected content), editing bibliographic information, manually inputting content and/or bibliographic information, exporting to a secondary application, etc. Step 1145 is shown using the standard flowchart shape for a pre-defined process. To avoid overcomplicating the drawing, details of this step have been omitted here. At 1150, project entry 1182, in whole or in part, or any updates or changes to the project entry, may be transmitted to server 1170 to be reflected in storage (e.g., in a database 1171). In addition, in some embodiments, user provided bibliographic information may be used to update the "global" set of bibliographic information 1190. In some embodiments, rules may be implemented to improve accuracy and to prevent malicious editing of bibliographic information. In one example, user provided bibliographic information may be used to update the "global" set of bibliographic information only after a predetermined number of users have provided the same information. (Consider, here, too, the earlier discussion of FIGS. 7a-c, especially as regarding global bibliographic information.)

Database 1171 of FIG. 9 depicts certain data organization as may be utilized in an embodiment. Database 1171 includes storage for the data associated with a particular user account (1172). The database could likely include storage for the data associated with many individual user accounts and so, logically, many instances of user storage 1172. User storage 1172 is shown to include project storage 1173 which represents storage for the data associated with a particular project of the user associated with user storage 1172. In turn, user storage 1172 could likely include storage for the data associated with many individual user projects and so, logically, many instances of project storage 1173. Project storage 1173 is shown to include entry storage 1182a which represents storage for the data associated with a particular citation entry within the project associated with project storage 1173. In turn, project storage 1173 could likely include storage for the data associated with many individual citation entries and so, logically, many instances of entry storage 1182a. The hierarchical relationship just described is not missed by one of skill in the art. Entry storage instance 1182a, though not shown, should be understood to include content, bibliographic, and annotation data as described and shown for entry 1182, and to specifically reflect the content storage portion 1184, bibliographic information storage portion 1186, and annotations storage portion 1187 of entry 1182. Global bibliographic information block 1190 represents storage of database 1171 that includes data that, in contrast, is not user specific. While not specifically shown, global bibliographic information storage should be understood from earlier discussions to include many multi-field bibliographic entries, and information for possibly associating each of those entries with, for example, URL information or a domain name. The collection of information items for an individual entry in global bibliographic information storage 1190 may be identical to, or closely mirror the structure and content of the bibliographic information storage portion of the user entry (such as 1186 of 1182), but need not do so in an embodiment. Although embodiments have been described using a browser extension which extends the capabilities of a web browser, one of skill in the art will appreciate that principles of the invention may be implemented as a stand-alone application for desktop and laptop PCs, as well as for mobile devices (e.g., smartphones, tablets, etc.).

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

The invention claimed is:

1. A method of aggregating user selected content using a web browser extension, the method comprising:
    receiving a user interface signal indicating a user selection of content displayed in a web browser application, the user being distinct from a creator of the content;
    capturing the selected content in response to a user interface action;
    extracting bibliographic information corresponding to the selected content;
    transmitting the selected content and the bibliographic information to an application server for storage on the application server;

displaying one or more input fields for the user to manually provide user input that supplies missing bibliographic information corresponding to the content or edits the extracted bibliographic information corresponding to the content;

receiving user input bibliographic information from the user via the one or more input fields;

integrating the user input bibliographic information with the bibliographic information for the user;

presenting the content and a subset of the bibliographic information to the user, the subset of the bibliographic information being presented in accordance with a user selected bibliographic format;

determining that a quantity of occurrences of receiving the user input bibliographic information satisfies a threshold, the threshold being greater than one and the occurrences including receiving the user input bibliographic information from the user and receiving the user input bibliographic information from additional users in association with the content, wherein the user input bibliographic information received from the additional users is the same as the user input bibliographic information received from the user and wherein receiving the user input bibliographic information from the additional users is in response to the additional users supplying missing bibliographic information corresponding to the content or editing extracted bibliographic information corresponding to the content;

saving, on the application server as part of global bibliographic information, the user input bibliographic information and a corresponding identifier associated with the content; and based on determining that the quantity of the occurrences satisfies the threshold, identifying, for one or more additional subsequent users that select at least a portion of the content, the saved user input bibliographic information as bibliographic information corresponding to the portion of the content.

2. The method of claim 1, further comprising:
displaying a user interface element for the user to initiate the user interface action in response to the user selection of content.

3. The method of claim 2, wherein the user interface element is an in-line capture button, and wherein the user interface action comprises clicking of the capture button.

4. The method of claim 1, wherein the user interface action comprises clicking of a button in a toolbar, wherein the toolbar is displayed within the browser application.

5. The method of claim 1, further comprising:
displaying an input field for the user to input a note corresponding to the selected content; and
receiving a user interface signal comprising the note.

6. The method of claim 5, further comprising:
transmitting the note to the application server for storage on the application server.

7. The method of claim 5, further comprising:
associating the user selected content, the note, and the bibliographic information with a user project entry.

8. The method of claim 7, further comprising:
displaying an option to export one or more of the user selected content, the note, and the subset of the bibliographic information to a secondary application; and
exporting one or more of the user selected content, the note, and the subset of the bibliographic information to the secondary application in response to receiving a user interface signal indicating selection of the option.

9. The method of claim 8, wherein the secondary application is a word processing application.

10. The method of claim 9, wherein the secondary application is an email application.

11. The method of claim 8, wherein the secondary application is a social networking application.

12. The method of claim 8, wherein the secondary application is a cloud storage application.

13. The method of claim 1, wherein the user selected bibliographic format is determined by:
displaying an option to select a bibliographic format from a plurality of bibliographic formats; and
receiving a user interface signal specifying the selected bibliographic format from the plurality of bibliographic formats.

14. The method of claim 1, wherein the content displayed in the browser application comprises textual information.

15. The method of claim 14, wherein the textual information is part of a pdf document.

16. The method of claim 1, wherein presenting the subset of the bibliographic information comprises:
retrieving global bibliographic information from the one or more servers; and
integrating the global bibliographic information with the bibliographic information.

17. The method of claim 1, wherein presenting the content and the subset of the bibliographic information comprises presenting the content and the subset of the bibliographic information in a pop-up window.

18. The method of claim 1, wherein presenting the content and the subset of the bibliographic information comprises presenting the content and the subset of the bibliographic information in a webpage.

19. The method of claim 1, wherein the content is from a webpage and wherein identifying, for the one or more additional users that select at least a portion of the content, the saved user input bibliographic information as the bibliographic information corresponding to the portion of the content comprises:
retrieving the saved user input bibliographic information;
extracting other portions of the bibliographic information from the webpage; and
integrating the saved user input bibliographic information with the extracted other portions of the bibliographic information; and
presenting the saved user input bibliographic information and the extracted other portions of the bibliographic information to the one or more additional users as the bibliographic information corresponding to the portion of the content.

20. The method of claim 19, wherein extracting the other portions of the bibliographic information from the webpage comprises:
obtaining bibliographic extraction rules specific to a domain or URL of the webpage; and
extracting the other portions of the bibliographic information based on the bibliographic extraction rules specific to the domain or the URL of the webpage.

21. The method of claim 1, wherein the content is from a webpage and wherein extracting the bibliographic information corresponding to the selected content comprises:
obtaining bibliographic extraction rules specific to the webpage; and
extracting the selected content based on the bibliographic extraction rules specific to the webpage.

22. The method of claim 21, wherein obtaining bibliographic extraction rules specific to the webpage comprises:

submitting a request to obtain extraction rules specific to a domain or URL of the webpage; and receiving the bibliographic extraction rules in response to the request.

23. A non-transitory computer readable medium having stored thereon computer executable instructions for causing a computer to execute a method, the method comprising:

receiving a user interface signal indicating a user selection of content displayed in a web browser application, the user being distinct from a creator of the content;

capturing the selected content in response to a user interface action;

extracting bibliographic information corresponding to the selected content;

transmitting the selected content and the bibliographic information to an application server for storage on the application server;

displaying one or more input fields for the user to manually provide user input that supplies missing bibliographic information corresponding to the content or edits the extracted bibliographic information corresponding to the content;

receiving user input bibliographic information from the user via the one or more input fields;

integrating the user input bibliographic information with the bibliographic information for the user; and presenting the content and a subset of the bibliographic information to the user, the subset of the bibliographic information being presented in accordance with a user selected bibliographic format;

determining that a quantity of occurrences of receiving the user input bibliographic information satisfies a threshold, the threshold being greater than one and the occurrences including receiving the user input bibliographic information from the user and receiving the user input bibliographic information from additional users in association with the content, wherein the user input bibliographic information received from the additional users is the same as the user input bibliographic information received from the user and wherein receiving the user input bibliographic information from the additional users is in response to the additional users supplying missing bibliographic information corresponding to the content or editing extracted bibliographic information corresponding to the content;

saving, on the application server as part of global bibliographic information, the user input bibliographic information and a corresponding identifier associated with the content; and based on determining that the quantity of the occurrences satisfies the threshold, identifying, for one or more additional subsequent users that select at least a portion of the content, the saved user input bibliographic information as bibliographic information corresponding to the portion of the content.

* * * * *